US012486143B2

(12) United States Patent
Ishiguro

(10) Patent No.: US 12,486,143 B2
(45) Date of Patent: Dec. 2, 2025

(54) ELEVATOR CONTROL DEVICE

(71) Applicant: Mitsubishi Electric Corporation, Tokyo (JP)

(72) Inventor: Hidetaka Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1238 days.

(21) Appl. No.: 17/269,250

(22) PCT Filed: Oct. 3, 2018

(86) PCT No.: PCT/JP2018/037033
§ 371 (c)(1),
(2) Date: Feb. 18, 2021

(87) PCT Pub. No.: WO2020/070829
PCT Pub. Date: Apr. 9, 2020

(65) Prior Publication Data

US 2021/0163262 A1 Jun. 3, 2021

(51) Int. Cl.
*B66B 5/12* (2006.01)
*B66B 1/34* (2006.01)
*B66B 5/16* (2006.01)

(52) U.S. Cl.
CPC ............ *B66B 5/125* (2013.01); *B66B 1/3492* (2013.01); *B66B 5/16* (2013.01)

(58) Field of Classification Search
CPC .......... B66B 5/125; B66B 5/16; B66B 1/3492
USPC .......................................................... 187/393
See application file for complete search history.

(56) References Cited

U.S. PATENT DOCUMENTS 5,698,823 A * 12/1997 Tanahashi ................. B66B 1/30 187/296
9,505,587 B2 * 11/2016 Okada ....................... B66B 5/16
9,868,615 B2 * 1/2018 Helvilä ..................... B66B 5/02
2007/0284196 A1 * 12/2007 Sakai ...................... B66B 1/285 187/305

(Continued)

FOREIGN PATENT DOCUMENTS

CN 101068736 A * 11/2007 ............. B66B 1/308
CN 103328362 A * 9/2013 ........... F16D 63/002
CN 110382390 A * 10/2019 ........... B66B 5/0025

(Continued)

OTHER PUBLICATIONS

International Search Report and Written Opinion mailed on Dec. 11, 2018, received for PCT Application PCT/JP2018/037033, Filed on Oct. 3, 2018, 11 pages including English Translation.

*Primary Examiner* — Christina M Schreiber
(74) *Attorney, Agent, or Firm* — XSENSUS LLP

(57) ABSTRACT

Provided is a control device for an elevator including: a first control unit configured to control a hoisting machine configured to raise and lower a car and a counterweight in a hoistway; and a second control unit configured to obtain a generation torque which is a torque to be generated by the hoisting machine, and to limit the obtained generation torque to be generated by the hoisting machine so that the obtained generation torque is lower than an abnormal torque which is the generation torque generated when, under a state in which a movement of one of elevating bodies which are the car and the counterweight is limited, the other elevating body is wound by the hoisting machine.

15 Claims, 8 Drawing Sheets

(56) References Cited

U.S. PATENT DOCUMENTS

| | | | | |
|---|---|---|---|---|
| 2012/0186916 | A1* | 7/2012 | Kigawa | B66B 5/00 187/393 |
| 2012/0292136 | A1* | 11/2012 | Washio | B66B 5/0031 187/393 |
| 2013/0113398 | A1* | 5/2013 | Kato | H02P 21/141 318/400.02 |
| 2014/0176028 | A1* | 6/2014 | Tobari | B60L 3/003 318/400.15 |
| 2016/0167921 | A1* | 6/2016 | Kattainen | B66B 1/24 187/289 |
| 2019/0031470 | A1* | 1/2019 | Furuta | B66B 1/304 |
| 2019/0202663 | A1* | 7/2019 | Camenzind | B66B 5/02 |
| 2020/0391976 | A1* | 12/2020 | Viljanen | B66B 5/28 |
| 2021/0163262 | A1* | 6/2021 | Ishiguro | B66B 5/10 |
| 2024/0294356 | A1* | 9/2024 | Stolt | B66B 5/04 |

FOREIGN PATENT DOCUMENTS

| | | | | | |
|---|---|---|---|---|---|
| EP | 1481933 | A1 | * | 12/2004 | B66B 5/0093 |
| EP | 2865629 | B1 | * | 11/2016 | B66B 5/02 |
| JP | 2007145589 | A | * | 6/2007 | |
| JP | 2007197155 | A | * | 8/2007 | |
| JP | 4079886 | B2 | | 4/2008 | |
| JP | 2011037545 | A | * | 2/2011 | |
| JP | 4828215 | B2 | * | 11/2011 | |
| JP | 2013-42630 | A | | 2/2013 | |
| JP | 2016-20246 | A | | 2/2016 | |
| JP | 2016020246 | A | * | 2/2016 | |
| JP | 2016166071 | A | * | 9/2016 | |
| JP | 6394849 | B1 | * | 9/2018 | B66B 5/00 |
| WO | 2012/014526 | A1 | | 2/2012 | |
| WO | WO-2019111404 | A1 | * | 6/2019 | B66B 5/02 |
| WO | WO-2019198153 | A1 | * | 10/2019 | B66B 5/18 |
| WO | WO-2019215844 | A1 | * | 11/2019 | B66B 5/0093 |

* cited by examiner

ELEVATOR CONTROL DEVICE

CROSS-REFERENCE TO RELATED APPLICATION

The present application is based on PCT filing PCT/JP2018/037033, filed Oct. 3, 2018, the entire contents of which are incorporated herein by reference.

TECHNICAL FIELD

The present invention relates to a control device for an elevator including: a first control unit configured to control a hoisting machine configured to raise and lower a car and a counterweight in a hoistway; and a second control unit configured to limit a torque to be generated by the hoisting machine.

BACKGROUND ART

In a related-art elevator of a traction type, a traction capacity between a driving sheave of a hoisting machine and a rope is designed so that the driving sheave idly rotates when an emergency stop device provided for the car is activated (for example, see Patent Literature 1).

CITATION LIST

Patent Literature

[PTL 1] JP 4079886 B2

SUMMARY OF INVENTION

Technical Problem

In this configuration, when the traction capacity is increased as a lifting height of the elevator increases, a second elevating body may be wound by the hoisting machine depending on a magnitude of a torque to be generated by the hoisting machine under a state in which a movement of a first elevating body is limited. The first elevating body is one elevating body of a car and a counterweight which are suspended by a rope, and the second elevating body is the other elevating body.

As specific cases in which the second elevating body is wound by the hoisting machine under the state in which the movement of the first elevating body is limited, the following cases are conceivable.

(A) A case in which the counterweight being the second elevating body is wound by the hoisting machine under a state in which the movement of the car being the first elevating body is limited by the emergency stop device (B) A case in which the car being the second elevating body is wound by the hoisting machine under a state in which the counterweight being the first elevating body is in contact with a buffer so that a downward movement of the counterweight is limited The present invention has been made to solve the above-mentioned problems, and has an object to provide a control device for an elevator which is configured to suppress, under a state in which a movement of a first elevating body suspended by a rope is limited, winding of a second elevating body by a hoisting machine.

Solution to Problem

According to one embodiment of the present invention, there is provided a control device for an elevator including:

a first control unit configured to control a hoisting machine configured to raise and lower a car and a counterweight in a hoistway; and a second control unit configured to obtain a generation torque which is a torque to be generated by the hoisting machine, and to limit the obtained generation torque to be generated by the hoisting machine so that the obtained generation torque is lower than an abnormal torque which is the generation torque generated when, under a state in which a movement of one of elevating bodies which are the car and the counterweight is limited, the other elevating body is wound by the hoisting machine.

Advantageous Effects of Invention

According to the present invention, it is possible to provide the control device for an elevator which is configured to suppress, under the state in which the movement of the first elevating body suspended by the rope is limited, the winding of the second elevating body by the hoisting machine.

DESCRIPTION OF EMBODIMENTS

Now, a control device for an elevator according to exemplary embodiments of the present invention is described with reference to the accompanying drawings. In the illustration of the drawings, the same components are denoted by the same reference symbols, and an overlapping description thereof is herein omitted.

First Embodiment

Figure 1:
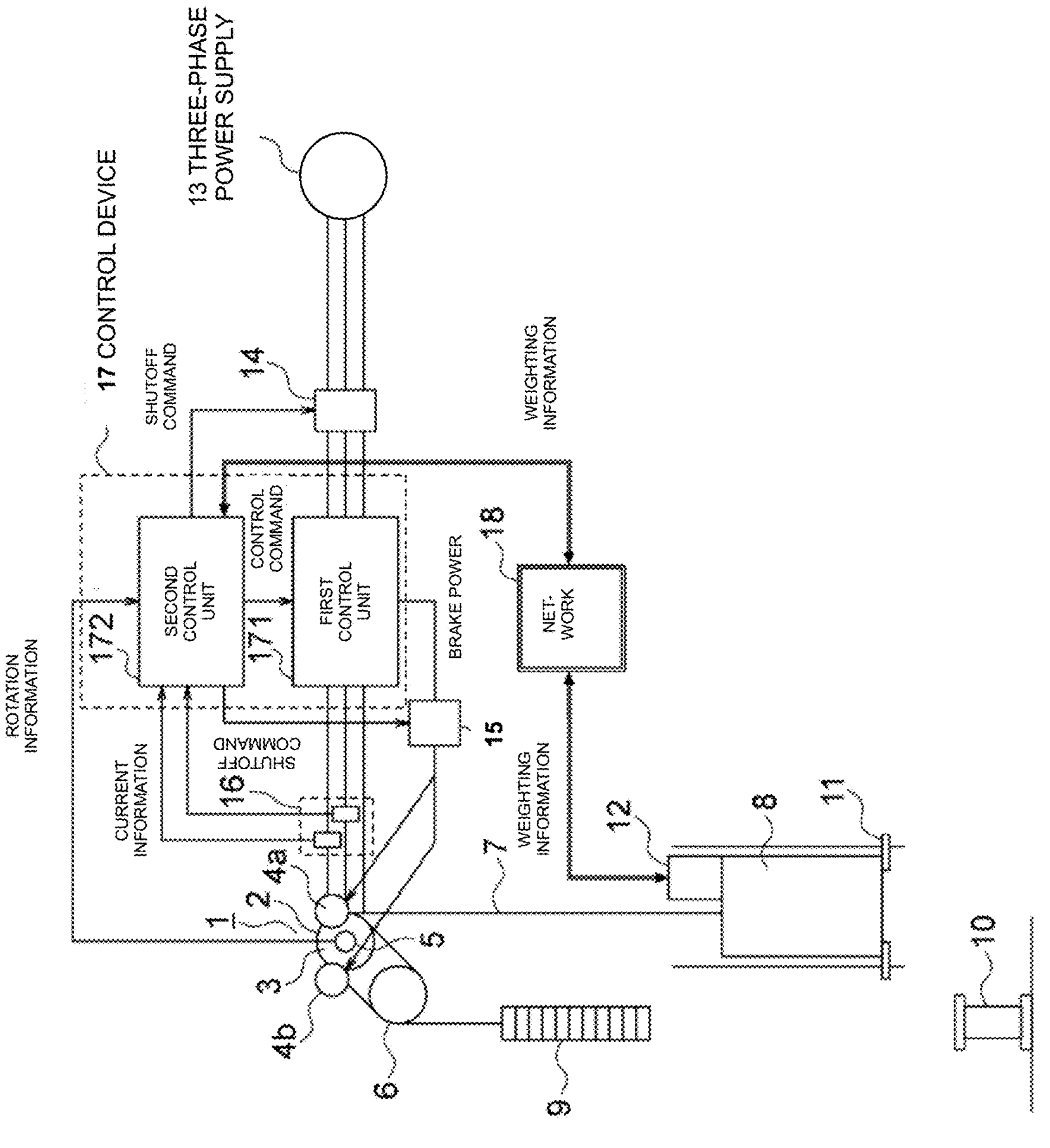
FIG. 1 is a schematic diagram for illustrating an overall configuration of an elevator including a control device for an elevator according to a first embodiment of the present invention.

FIG. 1 is a schematic diagram for illustrating an overall configuration of an elevator including a control device 17 for an elevator according to a first embodiment of the present invention.

In FIG. 1, a hoisting machine 1 is provided in an upper portion of a hoistway of the elevator. The hoisting machine 1 raises and lowers a car 8 and a counterweight 9 in the hoistway. The hoisting machine 1 includes a driving sheave 2, a three-phase motor 3, and a pair of brakes 4*a* and 4*b*. The three-phase motor 3 rotates the driving sheave 2. The brakes 4*a* and 4*b* brake the rotation of the driving sheave 2.

A rotation detector 5 is provided for the three-phase motor 3. The rotation detector 5 detects rotation information on the rotation of the three-phase motor 3. The rotation detector 5 outputs the detected rotation information to the control device 17. As the rotation detector 5, for example, an encoder or a resolver is used. When an encoder is used as the rotation detector 5, the rotation detector 5 detects a signal generated in accordance with the rotation of the three-phase motor 3, specifically, a voltage having a shape of a pulse or a sinusoidal wave, as the rotation information. The control device 17 obtains a rotation position of the three-phase motor 3, that is, a rotation angle of a rotor of the three-phase motor 3, from the rotation information detected by the rotation detector 5.

A deflector sheave 6 is installed to be spaced apart from the driving sheave 2 in the upper portion of the hoistway. A rope 7 is wound on the driving sheave 2 and the deflecting sheave 6.

The car 8 is connected to a first end portion of the rope 7. The counterweight 9 is connected to a second end portion of the rope 7. The car 8 and the counterweight 9 are suspended by the rope 7 in the hoistway. The car 8 and the counterweight 9 is raised and lowered in the hoistway by the driving sheave 2 being rotated by the three-phase motor 3.

The brakes 4*a* and 4*b* apply braking forces to the driving sheave 2 when supply of brake power is shut off, and release the application of the braking forces to the driving sheave 2 when the brake power is supplied thereto. When the braking forces are applied to the driving sheave 2 from the brakes 4*a* and 4*b*, the rotation of the driving sheave 2 is braked.

A buffer 10 configured to buffer an impact applied when the counterweight 9 collides with the buffer 10 is provided at a lowermost end of the hoistway. Moreover, a buffer (not shown) configured to buffer an impact applied when the car 8 collides with the buffer is also provided at the lowermost end of the hoistway. An emergency stop device 11 configured to be activated when the car 8 falls is provided at a lower portion of the car 8.

A weighing device 12 is provided on an upper portion of the car 8. The weighing device 12 detects an in-car load which is a load in the car 8 as weighing information. The weighing device 12 transmits the detected weighing information to the control device 17 through a network 18.

Power is supplied from a three-phase power supply 13 to the three-phase motor 3 through a main contactor 14. When a shutoff command described later is given to the main contactor 14, the main contactor 14 shuts off the supply of the power to the three-phase motor 3.

Power is supplied from a first control unit 171 described later to the brakes 4*a* and 4*b* through a brake contactor 15. When the shutoff command described later is given to the brake contactor 15, the brake contactor 15 shuts off the supply of the power to the brakes 4*a* and 4*b*.

There is exemplified the case in which the main contactor 14 and the brake contactor 15 to be activated in response to the shutoff command are used to achieve the configuration for shutting off the supply of the power to the hoisting machine 1, but the configuration is not limited to this example. That is, the configuration for shutting off the supply of the power to the hoisting machine 1 may be achieved through electrical processing performed by a relay circuit or the like, or electronic processing performed by a board or the like.

A current detector 16 detects current information on currents flowing thorough the three-phase motor 3. The current detector 16 may be configured to detect currents in the three phases flowing through the three-phase motor 3 as the current information, or may be configured to detect currents in two phases of the currents in the three phases flowing through the three-phase motor 3 as the current information. That is, the current detector 16 is configured to detect the currents in two or more phases of the currents in the three phases flowing through the three-phase motor 3 as the current information. The current detector 16 outputs the detected current information to the control device 17.

The control device 17 includes the first control unit 171 and a second control unit 172. Each of the first control unit 171 and the second control unit 172 is implemented by, for example, a microcomputer.

The first control unit 171 controls the hoisting machine 1. Specifically, the first control unit 171 controls the three-phase motor 3 of the hoisting machine 1 through, for example, vector control. When a control command described later is given to the first control unit 171, the first control unit 171 performs processing of reducing a torque to be generated by the three-phase motor 3 of the hoisting machine 1, that is, a generation torque T.

The second control unit 172 is provided independently of the first control unit 171. In other words, the microcomputer implementing the second control unit 172 is another microcomputer independent of the microcomputer implementing the first control unit 171. In this case, the second control unit 172 operates independently of the first control unit 171.

However, the second control unit 172 is not required to be provided independently of the first control unit 171. In other words, the microcomputer implementing the second control unit 172 may be the same microcomputer as the microcomputer implementing the first control unit 171.

The second control unit 172 obtains the generation torque T to be generated by the hoisting machine 1. Specifically, the second control unit 172 obtains current information from the current detector 16, and calculates the generation torque T based on the obtained current information, to thereby obtain the generation torque T.

Description is now given of an example of a method of calculating the generation torque by the second control unit 172. The second control unit 172 further obtains the rotation information from the rotation detector 5. The second control unit 172 detects the three-phase currents flowing through the three-phase motor 3 from the obtained current information, and detects the rotation position of the three-phase motor 3 from the obtained rotation information. After that, the second control unit 172 converts the three-phase currents flowing through the three-phase motor 3 based on the rotation position of the three-phase motor 3, to thereby calculate a current vector on rotating two axes, that is, on dq axes. The current vector on the dq axes is formed of a d-axis current which is a d-axis component, and a q-axis current which is a q-axis component.

The second control unit 172 calculates the generation torque T based on a magnitude of the q-axis current which is the q-axis component of the current vector obtained through the conversion.

The second control unit 172 may be configured to calculate the generation torque T as described below when the first control unit 171 performs control of bringing the d-axis current to 0 in a case in which the first control unit 171 uses the vector control to control the three-phase motor 3 of the hoisting machine 1.

That is, the second control unit 172 applies the coordinate conversion to the three-phase currents flowing through the three-phase motor 3, to thereby calculate the current vector on the dq axes, and calculates the generation torque T based on the magnitude of the calculated current vector. That is, the d-axis current is controlled so as to be 0, and the magnitude of the current vector on the dq axes is thus approximately equivalent to a magnitude of the q-axis current. Accordingly, the generation torque T can be calculated from the magnitude of the current vector, that is, the magnitude of the q-axis current, without using the rotation information on the three-phase motor 3.

The second control unit 172 limits the generation torque T to be generated by the hoisting machine 1 so that the obtained generation torque T is lower than an abnormal torque. The abnormal torque is equivalent to the generation torque T generated when, under a state in which the movement of one elevating body of the car 8 and the counterweight 9 is limited, the other elevating body is wound by the hoisting machine 1.

The following example is given as a specific example of the configuration for limiting the generation torque T so as to be lower than the abnormal torque. That is, the second control unit 172 determines whether or not the obtained generation torque T is equal to or higher than a torque threshold value TH1 which is a first torque threshold value. The torque threshold value TH1 is a value equal to or lower than the abnormal torque, and is a value set in advance.

The second control unit 172 outputs a first command when the generation torque T is equal to or higher than the torque threshold value TH1 as a result of the determination. Specifically, the second control unit 172 gives the shutoff command to the main contactor 14 and the brake contactor 15 as the first command. As a result, the supply of the power to the hoisting machine 1 is shut off, and the hoisting machine 1 thus stops.

That is, when the shutoff command is given to the main contactor 14, the main contactor 14 shuts off the supply of the power to the three-phase motor 3. When the shutoff command is given to the brake contactor 15, the brake contactor 15 shuts off the supply of the power to the brakes 4*a* and 4*b*.

The second control unit 172 determines whether or not the obtained generation torque T is equal to or higher than a torque threshold value TH2 which is a second torque threshold value. The torque threshold value TH2 is a value lower than the torque threshold value TH1, and is a value set in advance.

The second control unit 172 outputs a second command when the generation torque T is equal to or higher than the torque threshold value TH2 as a result of the determination. Specifically, the second control unit 172 gives the control command to the first control unit 171 as the second command. As a result, the first control unit 171 performs processing of reducing the generation torque T (hereinafter referred to as "torque reduction processing") in response to the control command. Specifically, the first control unit 171 shuts off the supply of the power to the hoisting machine 1, to thereby stop the hoisting machine 1, in order to bring the generation torque T to 0 as an example of the torque reduction processing. The first control unit 171 performs control of continuing the drive of the hoisting machine 1 as another example of the torque reduction processing under a state in which the generation torque T is reduced to a value lower than the torque threshold value TH2.

Description is now further given of the torque threshold value TH1 and the torque threshold value TH2. First, description is given of the abnormal torque. The abnormal torque is the generation torque T generated when, under the state in which the movement of one elevating body (hereinafter referred to as "first elevating body") of the car 8 and the counterweight 9 is limited, the other elevating body (hereinafter referred to as "second elevating body") is wound by the hoisting machine 1.

The abnormal torque is an abnormal torque Ta which is a first abnormal torque, or an abnormal torque Tb which is a second abnormal torque.

The abnormal torque Ta is the generation torque T generated when the counterweight 9 being the second elevating body is wound by the hoisting machine 1 under a state in which the movement of the car 8 being the first elevating body is limited by the emergency stop device 11 provided for the car 8.

That is, when the generation torque T generated by the hoisting machine 1 is the abnormal torque Ta, the counterweight 9 is wound by the hoisting machine 1 under the state in which the movement of the car 8 is limited by the emergency stop device 11.

The abnormal torque Tb is the generation torque T generated when the car 8 being the second elevating body is wound by the hoisting machine 1 under the state in which the counterweight 9 being the first elevating body is in contact with the buffer 10 provided in the hoistway so that the downward movement of the counterweight 9 is limited.

That is, when the generation torque T generated by the hoisting machine 1 is the abnormal torque Tb, the car 8 is wound by the hoisting machine 1 under the state in which the counterweight 9 is in contact with the buffer 10 so that the downward movement of the counterweight 9 is limited.

The abnormal torque Ta and the abnormal torque Tb are values that can be obtained by calculation at an initial stage of elevator design, and are thus known values. The abnormal torque Ta and the abnormal torque Tb may be obtained by actually performing an operation test for the elevator at a site at which the elevator is installed.

The torque threshold value TH1 is a value equal to or lower than the abnormal torque. Specifically, as an example, the torque threshold value TH1 is a value that is equal to or lower than the abnormal torque Ta or is equal to or lower than the abnormal torque Tb. As another example, the torque threshold value TH1 is a value equal to or lower than the abnormal torque Ta, and equal to or lower than the abnormal torque Tb.

As described above, the torque threshold value TH2 is a value lower than the torque threshold value TH1.

Each of the values of the torque threshold value TH1 and the torque threshold value TH2 can appropriately be adjusted by an operator operating the control device 17. The torque threshold value TH1 and the torque threshold value TH2 may be adjusted by actually performing the operation test for the elevator at the site at which the elevator is installed.

The abnormal torques are considered to change in accordance with the position of the car 8. Thus, the second control unit 172 may be configured to obtain a car position which is the position of the car 8, and to correct the torque threshold value TH1 in accordance with the obtained car position. Similarly, the second control unit 172 may be configured to correct the torque threshold value TH2 in accordance with the obtained car position. With this configuration, the torque threshold value TH1 and the torque threshold value TH2 can more appropriately be set.

In the above-mentioned case, the second control unit 172 obtains the car position by, for example, converting the rotation information on the three-phase motor 3 obtained from the rotation detector 5 to the car position. More specifically, as a configuration for obtaining the car position, the following configuration is adopted. That is, an absolute-position plate is installed in the hoistway, and a sensor configured to read the absolute-position plate is mounted to the car 8. The second control unit 172 obtains the position of the car 8 in the hoistway from the absolute position read by the sensor mounted to the car 8 and a relative position obtained through use of the rotation information.

The second control unit 172 may be configured to correct the torque threshold value TH1 and the torque threshold value TH2 also in consideration of the in-car load obtained as the weighing information in addition to the car position.

Figure 2:
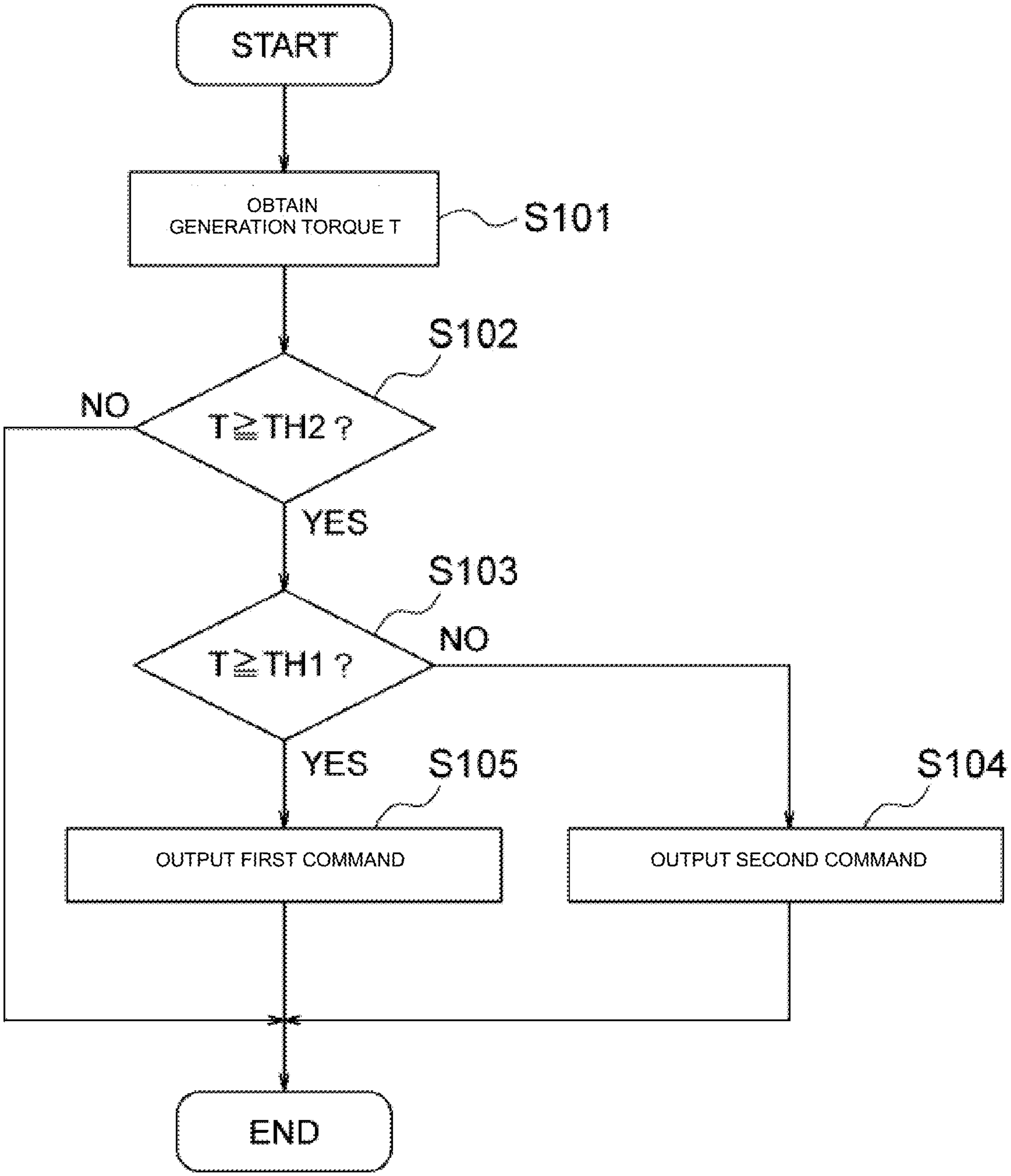
FIG. 2 is a flowchart for illustrating a series of processing procedures performed by a second control unit in the first embodiment of the present invention.

Referring to FIG. 2, description is now further given of the operation of the second control unit 172. FIG. 2 is a flowchart for illustrating a series of processing procedures performed by the second control unit 172 in the first embodiment of the present invention.

In Step S101, the second control unit 172 obtains the generation torque T generated by the hoisting machine 1. After that, the processing proceeds to Step S102.

In Step S102, the second control unit 172 determines whether or not the generation torque T obtained in Step S101 is equal to or higher than the torque threshold value TH2. When the generation torque T is determined to be equal to or higher than the torque threshold value TH2, the processing proceeds to Step S103. When the generation torque T is determined to be lower than the torque threshold value TH2, the processing is finished.

In Step S103, the second control unit 172 determines whether or not the generation torque T obtained in Step S101 is equal to or higher than the torque threshold value TH1. When the generation torque T is determined to be equal to or higher than the torque threshold value TH1, the processing proceeds to Step S105. When the generation torque T is determined to be lower than the torque threshold value TH1, the processing proceeds to Step S104.

In Step S104, the second control unit 172 outputs a second command in order to perform second torque reduction control of reducing the generation torque T to be generated by the hoisting machine 1 to a value lower than the torque threshold value TH2. After that, the processing is finished. As described above, the second control unit 172 performs the second torque reduction control when the obtained generation torque T is equal to or higher than the torque threshold value TH2 and is lower than the torque threshold value TH1.

In Step S105, the second control unit 172 outputs a first command in order to perform first torque reduction control of reducing the generation torque T to be generated by the hoisting machine 1 to a value lower than the torque threshold value TH1. After that, the processing is finished. As described above, the second control unit 172 performs the first torque reduction control when the obtained generation torque T is equal to or higher than the torque threshold value TH1.

Figure 3:
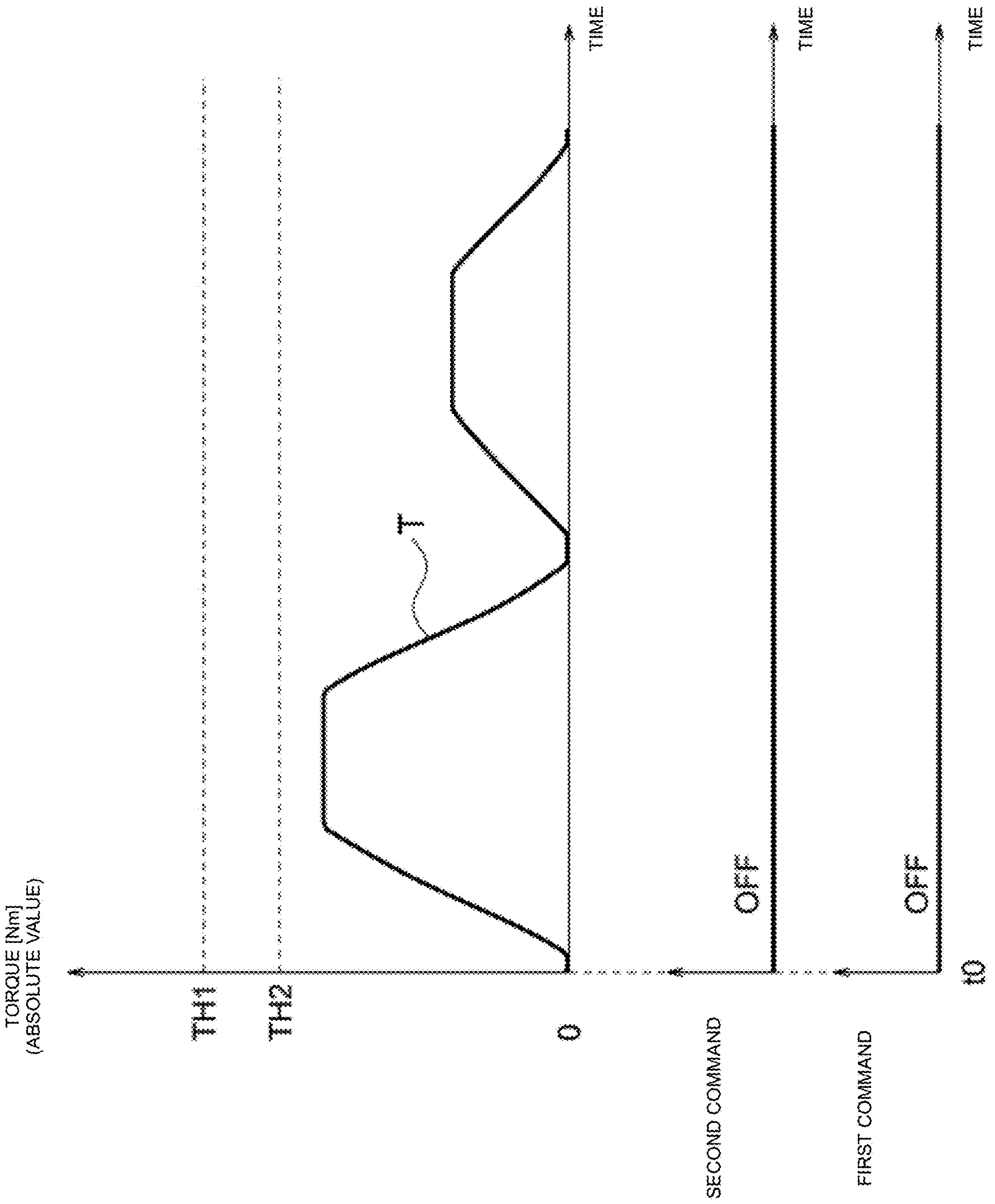
FIG. 3 is a timing chart for showing a first operation example of the second control unit in the first embodiment of the present invention.

Description is now given of an operation example of the second control unit 172. FIG. 3 is a timing chart for showing a first operation example of the second control unit 172 in the first embodiment of the present invention. In FIG. 3, an absolute value of the generation torque T is exemplified, but the generation torque T may be defined so as to take a positive value or a negative value in accordance with a travel direction of the car 8. Moreover, in FIG. 3, for the convenience of description, the generation torque T is exemplified in a case in which it is assumed that the car 8 and the counterweight 9 are in a balanced state. Therefore, when the car 8 travels at a constant speed, the generation torque T is a value of approximately 0. Further, regarding two trapezoidal waveforms exemplified in FIG. 3, a waveform on a left side in the drawing sheet represents a change in the generation torque T generated when the car 8 travels to accelerate. A waveform on a right side in the drawing sheet represents a change in the generation torque T generated when the car 8 travels to decelerate. As appreciated from those waveforms, there is shown an example in which the acceleration in the acceleration travel of the car 8 and the deceleration in the deceleration travel of the car 8 are different from each other. The above-mentioned point applies also to FIG. 4 to FIG. 8 described later.

In a top chart of FIG. 3, there is shown a change with time in the absolute value of the generation torque T calculated by the second control unit 172. In a middle chart of FIG. 3, there is shown a change with time in the second command output by the second control unit 172. In a bottom chart of FIG. 3, there is shown a change with time in the first command output by the second control unit 172.

In FIG. 3, after a time t0, the elevator normally operates, and the car 8 normally travels. In this case, the generation torque T is lower than the torque threshold value TH2, and the second control unit 172 does not thus output the first command and the second command.

As described above, when the generation torque T is lower than the torque threshold value TH2, the second control unit 172 does not output the first command and the second command. Thus, the first control unit 171 continues the drive of the hoisting machine 1, to thereby cause the car 8 to normally travel.

Figure 4:
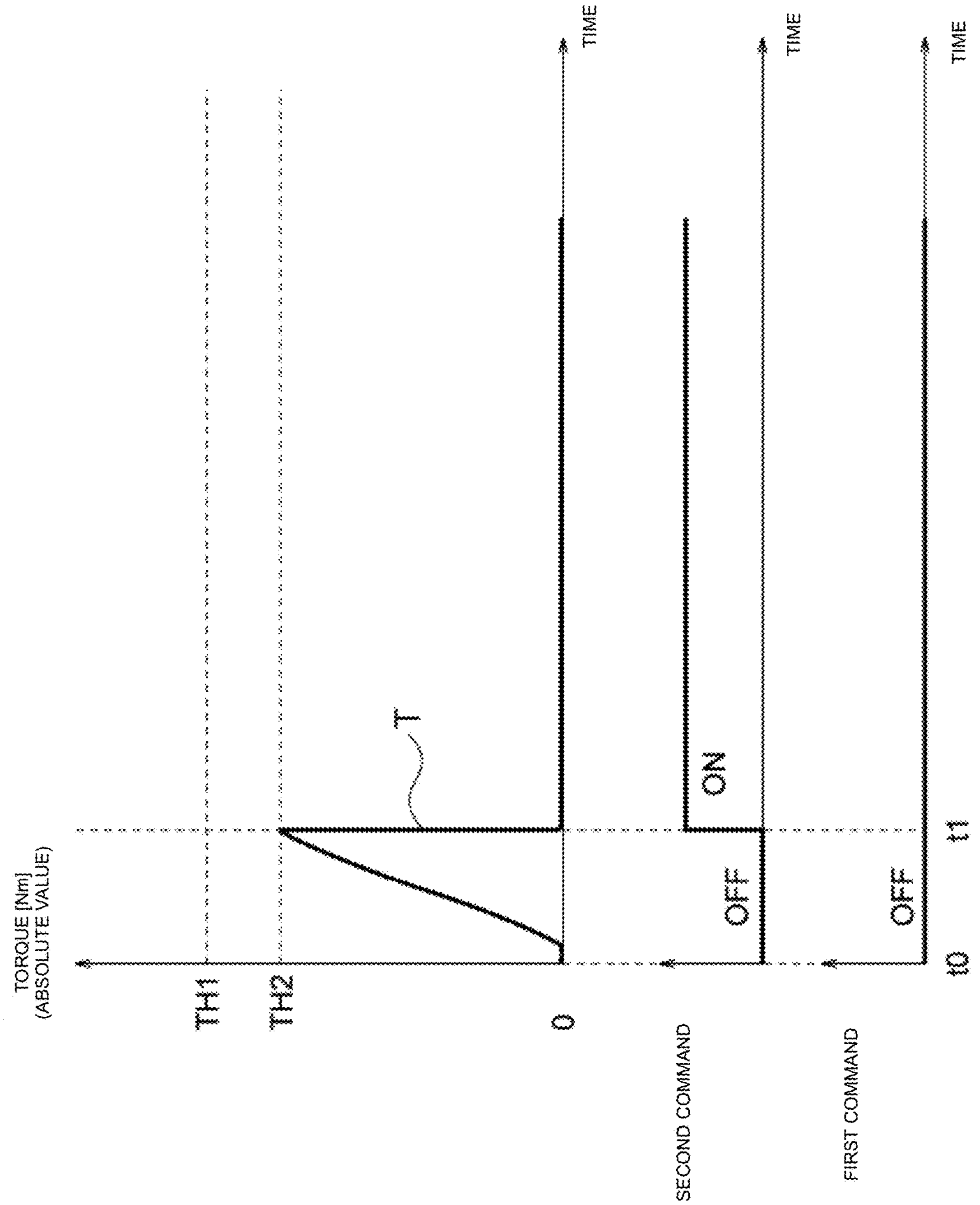
FIG. 4 is a timing chart for showing a second operation example of the second control unit in the first embodiment of the present invention.

FIG. 4 is a timing chart for showing a second operation example of the second control unit 172 in the first embodiment of the present invention.

In a top chart, a middle chart, and a bottom chart of FIG. 4, changes with time in the same parameters as those in the top chart, the middle chart, and the bottom chart of FIG. 3 are shown, respectively.

In FIG. 4, after the time t0, the generation torque T increases so much as to reach the torque threshold value TH2 compared with FIG. 3 due to an occurrence of a certain incident in the elevator.

When such an increase in the generation torque T continues, the generation torque T reaches the abnormal torque. When the movement of the first elevating body is limited under this state, the hoisting machine 1 may wind the second elevating body.

At a time t1, the generation torque T reaches the torque threshold value TH2. In this case, the generation torque T is equal to or higher than the torque threshold value TH2, and the control command being the second command is thus given to the first control unit 171. As a result, the first control unit 171 performs the torque reduction processing in accordance with the control command from the second control unit 172. In FIG. 4, there is exemplified a case in which the second control unit 172 is configured to cause the first control unit 171 to perform, as the second torque reduction control, the processing of shutting off the supply of the power to the hoisting machine 1, to thereby stop the hoisting machine 1. After the time t1, the generation torque T is 0.

Figure 5:
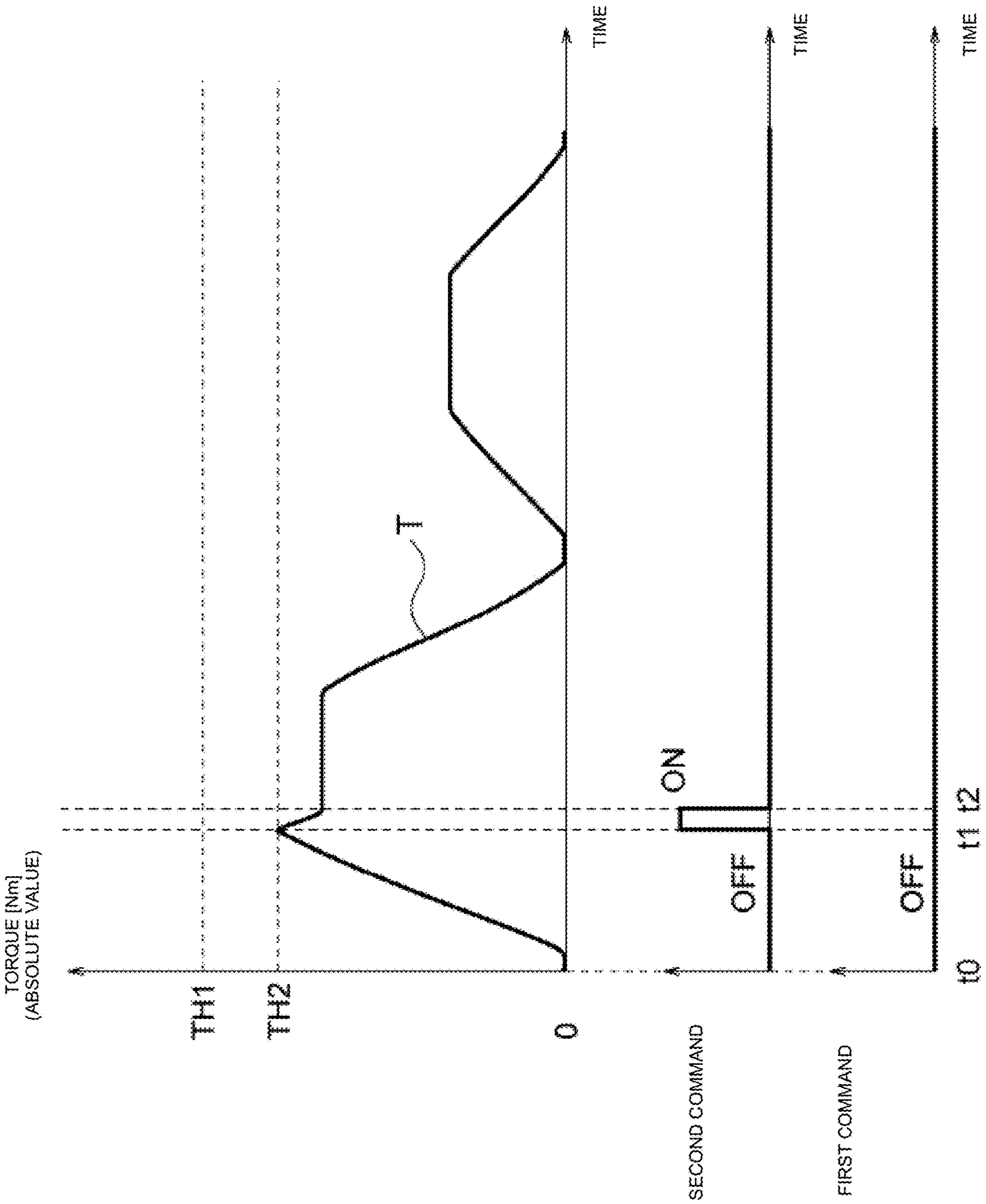
FIG. 5 is a timing chart for showing a third operation example of the second control unit in the first embodiment of the present invention.

When the second control unit 172 is configured to cause the first control unit 171 to perform, as the second torque reduction control, the control of continuing the drive of the hoisting machine 1 under the state in which the generation torque T is reduced to a value lower than the torque threshold value TH2, a change with time in the generation torque T is as shown in FIG. 5. FIG. 5 is a timing chart for showing a third operation example of the second control unit in the first embodiment of the present invention.

That is, as shown in FIG. 5, when the generation torque T reaches the torque threshold value TH2 at the time t1, the control command is given to the first control unit 171 as the second command. In this case, the first control unit 171 reduces the generation torque T to a value lower than the torque threshold value TH2. When the generation torque T reaches a value lower than the torque threshold value TH2, the first control unit 171 continues the drive of the hoisting machine 1, to thereby cause the car 8 to normally travel. The first control unit 171 may be configured to perform processing of stopping the hoisting machine 1 when a state in which, even when the control of continuing the drive of the hoisting machine 1 is performed, the rotation of the hoisting machine 1 is not detected continues for a certain period of time.

As described above, the first control unit 171 performs the control of continuing the drive of the hoisting machine 1 under the state in which the generation torque T is reduced to a value lower than the torque threshold value TH2 as the torque reduction processing in response to the control command from the second control unit 172. As a result, the hoisting machine 1 is not required to be temporarily stopped as shown in FIG. 4. Thus, as shown in FIG. 5, the first control unit 171 can continue the drive of the hoisting machine 1, to thereby cause the car 8 to normally travel.

As described above, when the obtained generation torque T is equal to or higher than the torque threshold value TH2 and is lower than the torque threshold value TH1, the second control unit 172 performs the second torque reduction control of reducing the generation torque T to a value lower than the torque threshold value TH2, to thereby limit the generation torque T. Specifically, as an example of the second torque reduction control, the second control unit 172 shuts off the supply of the power to the hoisting machine 1, to thereby stop the hoisting machine 1. As another example of the second torque reduction processing, the second control unit 172 causes the first control unit 171 to perform the control of continuing the drive of the hoisting machine 1 under the state in which the generation torque T is reduced to a value lower than the torque threshold value TH2.

With this configuration, it is possible to prevent the generation torque T from reaching the abnormal torque. Thus, even when there occurs the state in which the movement of the first elevating body is limited, the winding of the second elevating body by the hoisting machine 1 can be suppressed.

Figure 6:
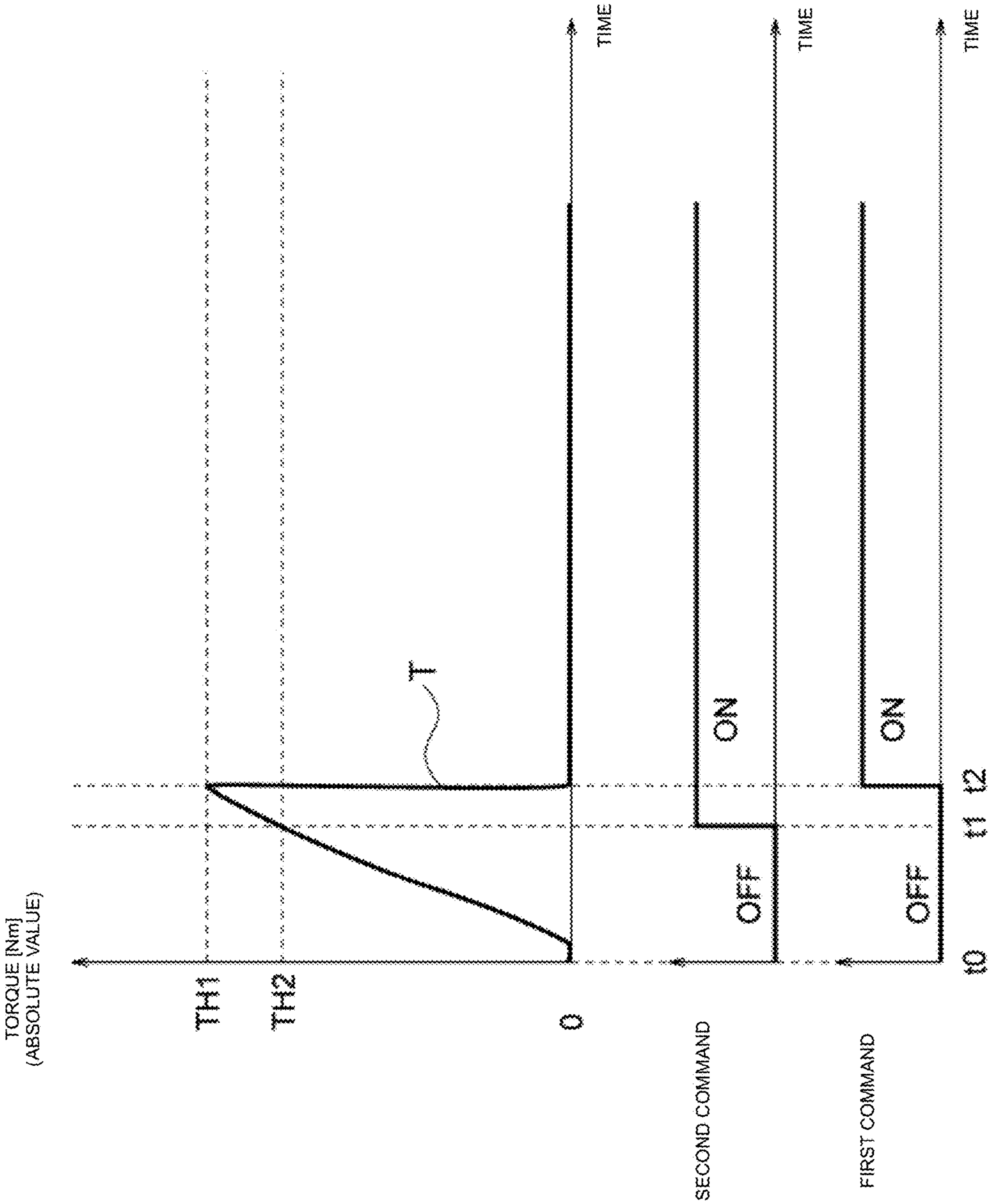
FIG. 6 is a timing chart for showing a fourth operation example of the second control unit in the first embodiment of the present invention.

FIG. 6 is a timing chart for showing a fourth operation example of the second control unit 172 in the first embodiment of the present invention.

In a top chart, a middle chart, and a bottom chart of FIG. 6, changes with time in the same parameters as those in the top chart, the middle chart, and the bottom chart of FIG. 3 are shown, respectively.

In FIG. 6, after the time t0, the generation torque T increases as in FIG. 4 due to an occurrence of a certain incident in the elevator.

At the time t1, the generation torque T reaches the torque threshold value TH2. In this case, the generation torque T is equal to or higher than the torque threshold value TH2, and the control command being the second command is thus given to the first control unit 171. However, the first control unit 171 cannot perform the torque reduction processing even when the control command is given from the second control unit 172 due to an occurrence of a certain incident in the first control unit 171.

Thus, the hoisting machine 1 continues the drive also after the time t1, and the generation torque T thus increases.

At a time t2, the generation torque T reaches the torque threshold value TH1. In this case, the generation torque T is equal to or higher than the torque threshold value TH1, and the first command is thus output. Specifically, the shutoff command is given as the first command to the main contactor 14 and the brake contactor 15. As a result, the supply of the power to the hoisting machine 1 is shut off independently of the first control unit 171, and the hoisting machine 1 thus stops. In FIG. 6, there is exemplified a case in which the second control unit 172 is configured to perform, as the first torque reduction control, processing of shutting off the supply of the power to the hoisting machine 1, to thereby stop the hoisting machine 1. After the time t2, the generation torque T is 0.

As described above, when the obtained generation torque T is equal to or higher than the torque threshold value TH1, the second control unit 172 performs the first torque reduction control of reducing the generation torque T to a value lower than the torque threshold value TH1, to thereby limit the generation torque T. Specifically, as an example of the first torque reduction control, the second control unit 172 shuts off the supply of the power to the hoisting machine 1 independently of the first control unit 171, to thereby stop the hoisting machine 1.

With this configuration, even when there occurs the state in which the first control unit 171 cannot perform the torque reduction processing in response to the control command from the second control unit 172, the generation torque T can be prevented from reaching the abnormal torque. In particular, a case of a failure of the first control unit 171 can be handled by providing the second control unit 172 independently of the first control unit 171. That is, in such a case, the shutoff command is given from the second control unit 172 to the main contactor 14 and the brake contactor 15, to thereby be able to stop the hoisting machine 1. The second control unit 172 may be formed as a dual system, and may be configured such that when one unit in the dual system fails, the other unit operates as a substitute. With this configuration, higher reliability can be secured for the second control unit 172.

In the first embodiment, there is exemplified the case in which the torque threshold value TH1 and the torque threshold value TH2 are used, but the torque threshold value TH2 is not required to be used. In this case, in the series of processing procedures illustrated in FIG. 2, the processing in Step S102 and Step S104 is omitted. In other words, the second control unit 172 is configured to obtain the generation torque T, and to then determine whether or not the generation torque T is equal to or higher than the torque threshold value TH1.

The second control unit 172 outputs the first command when the second control unit 172 determines that the generation torque T is equal to or higher than the torque threshold value TH1 as a result of the determination. Meanwhile, the second control unit 172 does nothing when the second control unit 172 determines that the generation torque T is lower than the torque threshold value TH1 as a result of the determination.

Figure 7:
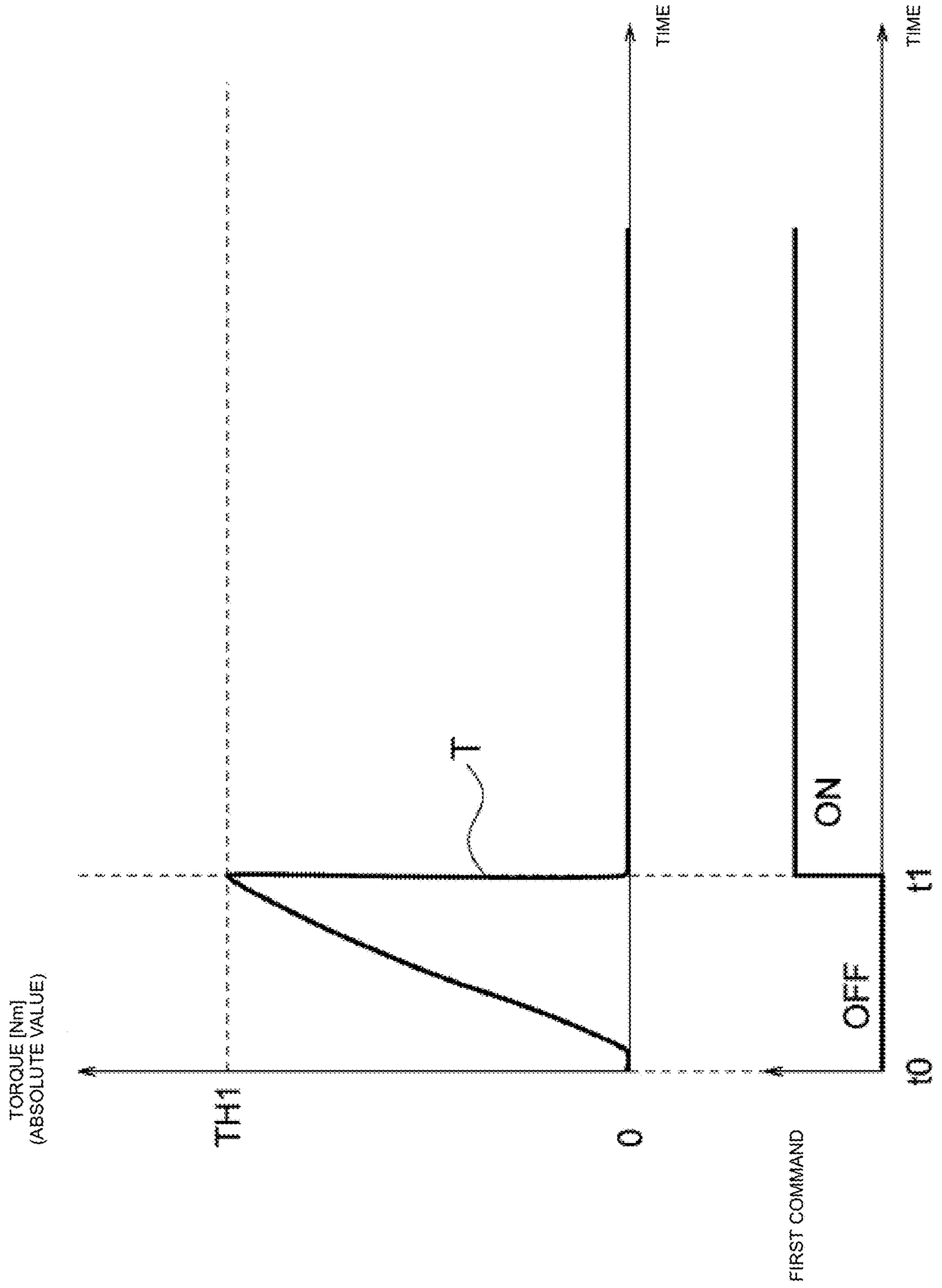
FIG. 7 is a timing chart for showing a first operation example at a time when the second control unit in the first embodiment of the present invention operates in a case in which one torque threshold value is used.

FIG. 7 is a timing chart for showing a first operation example at a time when the second control unit 172 in the first embodiment of the present invention operates in the case in which one torque threshold value is used.

In a top chart and a bottom chart of FIG. 7, changes with time in the same parameters as those in the top chart and the bottom chart of FIG. 3 are shown, respectively.

In FIG. 7, after the time t0, the generation torque T increases so much as to reach the torque threshold value TH1 due to an occurrence of a certain incident in the elevator. When such an increase in the generation torque T continues, the generation torque T reaches the abnormal torque. When the movement of the first elevating body is limited under this state, the hoisting machine 1 may wind the second elevating body.

At the time t1, the generation torque T reaches the torque threshold value TH1. In this case, the generation torque T is equal to or higher than the torque threshold value TH1, and the control command being the first command is thus given to the first control unit 171. As a result, the first control unit 171 performs the torque reduction processing in accordance with the control command. In FIG. 7, there is exemplified a case in which the second control unit 172 is configured to cause the first control unit 171 to perform, as the first torque reduction control, the processing of shutting off the supply of the power to the hoisting machine 1, to thereby stop the hoisting machine 1. After the time t1, the generation torque T is 0.

The second control unit 172 may be configured to perform processing of giving, as the first command, the shutoff command to the main contactor 14 and the brake contactor 15, to thereby shut off the power to the hoisting machine 1.

Figure 8:
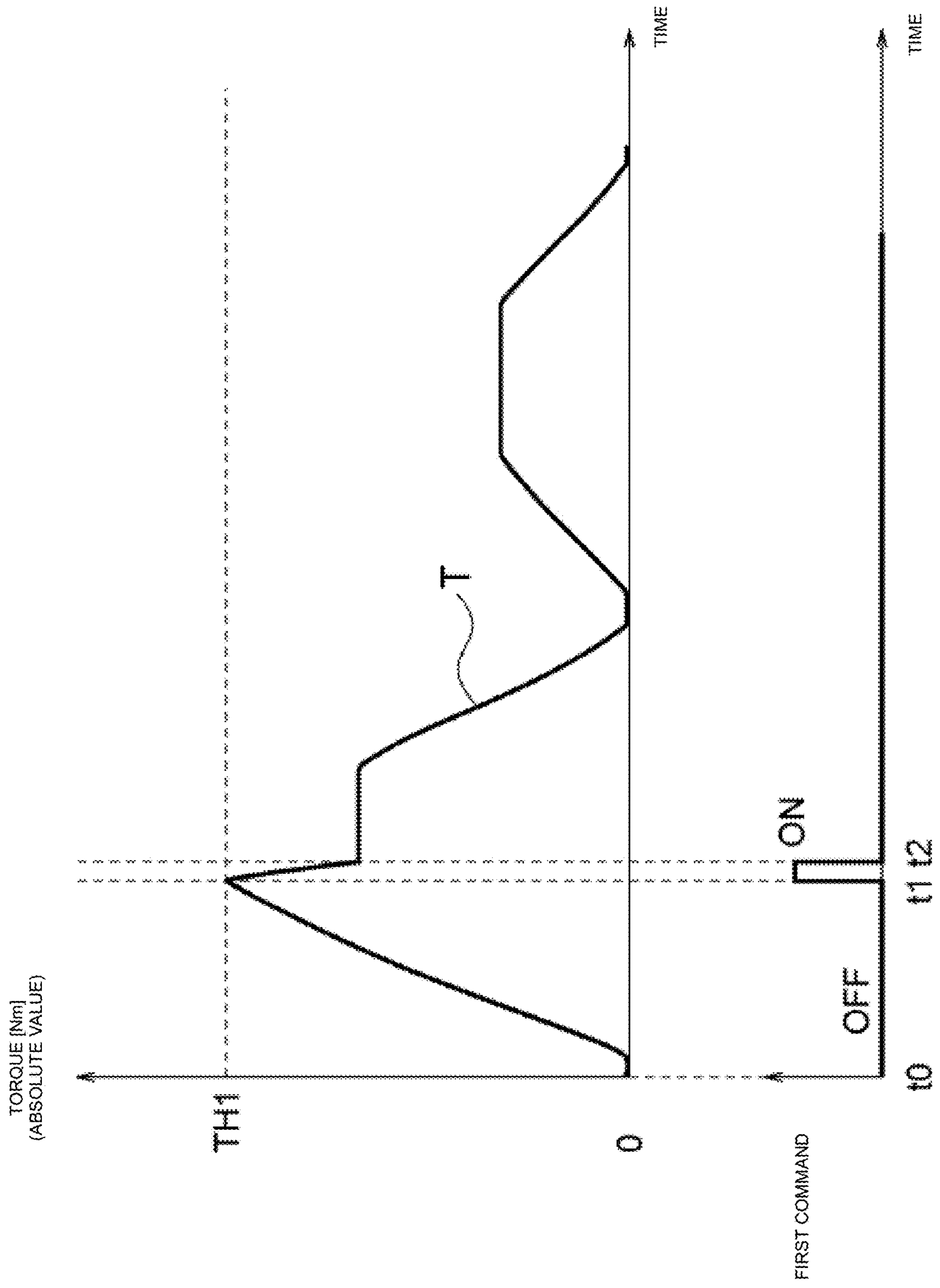
FIG. 8 is a timing chart for showing a second operation example at the time when the second control unit in the first embodiment of the present invention operates in the case in which the one torque threshold value is used.

When the second control unit 172 is configured to cause the first control unit 171 to perform, as the first torque reduction control, the control of continuing the drive of the hoisting machine 1 under the state in which the generation torque T is reduced to a value lower than the torque threshold value TH1, a change with time in the generation torque T is as shown in FIG. 8. FIG. 8 is a timing chart for showing a second operation example at the time when the second control unit 172 in the first embodiment of the present invention operates in the case in which the one torque threshold value is used.

That is, as shown in FIG. 8, when the generation torque T reaches the torque threshold value TH1 at the time t1, the control command is given to the first control unit 171 as the first command. In this case, the first control unit 171 reduces the generation torque T to a value lower than the torque threshold value TH1. When the generation torque T reaches a value lower than the torque threshold value TH1, the first control unit 171 continues the drive of the hoisting machine 1, to thereby cause the car 8 to normally travel.

As described above, the first control unit 171 performs the control of continuing the drive of the hoisting machine 1 under the state in which the generation torque T is reduced to a value lower than the torque threshold value TH1 as the torque reduction processing in response to the control command from the second control unit 172. As a result, the hoisting machine 1 is not required to be temporarily stopped as shown in FIG. 7. Thus, as shown in FIG. 8, the first control unit 171 can continue the drive of the hoisting machine 1, to thereby cause the car 8 to normally travel. The first control unit 171 may be configured to perform the processing of stopping the hoisting machine 1 when the state in which, even when the control of continuing the drive of the hoisting machine 1 is performed, the rotation of the hoisting machine 1 is not detected continues for the certain period of time.

As described above, when the obtained generation torque T is equal to or higher than the torque threshold value TH1, the second control unit 172 performs the first torque reduction control of reducing the generation torque T to a value lower than the torque threshold value TH1, to thereby limit the generation torque T. Specifically, as an example of the first torque reduction control, the second control unit 172 shuts off the supply of the power to the hoisting machine 1, to thereby stop the hoisting machine 1. As another example of the first torque reduction processing, the second control unit 172 causes the first control unit 171 to perform the control of continuing the drive of the hoisting machine 1 under the state in which the generation torque T is reduced to a value lower than the torque threshold value TH1.

With this configuration, it is possible to prevent the generation torque T from reaching the abnormal torque. Thus, even when there occurs the state in which the movement of the first elevating body is limited, the winding of the second elevating body by the hoisting machine 1 can be suppressed.

As described above, according to the first embodiment, the control device 17 for an elevator includes the first control unit 171 configured to control the hoisting machine 1 configured to raise and lower the car 8 and the counterweight 9 in the hoistway, and the second control unit 172 configured to obtain the generation torque T which is the torque to be generated by the hoisting machine 1, and to limit the generation torque T to be generated by the hoisting machine 1 so that the obtained generation torque T is lower than the abnormal torque. The abnormal torque is the generation torque T generated when, under the state in which the movement of one elevating body of the car 8 and the counterweight 9 is limited, the other elevating body is wound by the hoisting machine 1.

As a result, the winding of the second elevating body by the hoisting machine can be suppressed under the state in which the movement of the first elevating body suspended by the rope is limited. Moreover, it is possible to suppress falling of the second elevating body occurring immediately after the second elevating body is wound, and, as a result, a damage of a device due to the falling can be suppressed.

Each of the functions of the control device 17 according to the first embodiment is implemented by a processing circuit. The processing circuit for implementing each of the functions may be dedicated hardware, or a processor configured to execute a program stored in a memory.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof.

Meanwhile, when the processing circuit is a processor, the function of each of the first control unit 171 and the second control unit 172 is implemented by software, firmware, or a combination of software and firmware. The software and the firmware are coded as a program and stored in a memory. The processor reads out and executes the program stored in the memory, to thereby implement the function of each of the units.

In this case, the memory corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory also corresponds to, for example, a magnetic disk, a flexible disk, an optical disc, a compact disc, a MiniDisk, or a DVD.

Some of the functions of the respective units described above may be implemented by dedicated hardware, and other thereof may be implemented by software or firmware. In this manner, the processing circuit can implement the function of each of the units described above by hardware, software, firmware, or a combination thereof.

REFERENCE SIGNS LIST

1 hoisting machine, 2 driving sheave, 3 three-phase motor, 4*a*, 4*b* brake, 5 rotation detector, 6 deflecting sheave, 7 rope, 8 car, 9 counterweight, 10 buffer, 11 emergency stop device, 12 weighing device, 13 three-phase power supply, 14 main contactor, 15 brake contactor, 16 current detector, 17 control device for an elevator, 171 first control unit, 172 second control unit, 18 network

The invention claimed is:

1. A control device for an elevator, comprising:

a first control circuit configured to control a hoisting machine configured to raise and lower a car and a counterweight in a hoistway; and a second control circuit configured to obtain a generation torque which is a torque to be generated by the hoisting machine, and to limit the obtained generation torque to be generated by the hoisting machine so that the obtained generation torque is lower than an abnormal torque which is the generation torque generated when, under a state in which a movement of one of elevating bodies which are the car and the counterweight is limited, the other elevating body is wound by the hoisting machine, wherein the abnormal torque is a torque generated when the other elevating body is wound by the hoisting machine under one of a state in which the movement of the car being the one elevating body is limited by an emergency stop device provided for the car or a state in which the counterweight being the one elevating body is in contact with a buffer provided in the hoistway so that a downward movement of the counterweight is limited.

2. The control device for an elevator according to claim 1, wherein a value equal to or lower than the abnormal torque is set as a first torque threshold value, and wherein, when the obtained generation torque is equal to or higher than the first torque threshold value, the second control circuit performs first torque reduction control of reducing the generation torque to be generated by the hoisting machine to a value lower than the first torque threshold value, to thereby limit the generation torque.

3. The control device for an elevator according to claim 2, wherein the second control circuit is configured to shut off supply of power to the hoisting machine, to thereby stop the hoisting machine as the first torque reduction control.

4. The control device for an elevator according to claim 2, wherein the second control circuit is configured to cause the first control circuit to perform control of continuing drive of the hoisting machine as the first torque reduction control under a state in which the generation torque to be generated by the hoisting machine is reduced to a value lower than the first torque threshold value.

5. The control device for an elevator according to claim 2, wherein the second control circuit is configured to:

obtain a car position which is a position of the car; and correct the first torque threshold value in accordance with the obtained car position.

6. The control device for an elevator according to claim 2, wherein a value lower than the first torque threshold value is set as a second torque threshold value, and wherein, when the obtained generation torque is equal to or higher than the second torque threshold value and is lower than the first torque threshold value, the second control circuit performs second torque reduction control of reducing the generation torque to be generated by the hoisting machine to a torque lower than the second torque threshold value, to thereby limit the generation torque.

7. The control device for an elevator according to claim 6, wherein the second control circuit is configured to shut off supply of power to the hoisting machine, to thereby stop the hoisting machine as the second torque reduction control.

8. The control device for an elevator according to claim 6, wherein the second control circuit is configured to cause the first control circuit to perform control of continuing drive of the hoisting machine as the second torque reduction control under a state in which the generation torque to be generated by the hoisting machine is reduced to a value lower than the second torque threshold value.

9. The control device for an elevator according to claim 6, wherein the second control circuit is configured to:

obtain a car position which is a position of the car; and correct the second torque threshold value in accordance with the obtained car position.

10. The control device for an elevator according to claim 1, wherein the second control circuit is provided independently of the first control circuit.

11. The control device for an elevator according to claim 1, wherein the hoisting machine includes a three-phase motor, and wherein the second control circuit is configured to:

further obtain current information on a current flowing through the three-phase motor; and calculate the generation torque based on the obtained current information, to thereby obtain the generation torque.

12. The control device for an elevator according to claim 11, wherein the second control circuit is configured to:

further obtain rotation information on rotation of the three-phase motor;

detect three-phase currents flowing through the three-phase motor from the obtained current information;

detect a rotation position of the three-phase motor from the obtained rotation information;

apply coordinate conversion to the three-phase currents based on the rotation position, to thereby calculate a current vector on dq axes; and calculate the generation torque based on a magnitude of a q-axis current which is a q-axis component of the calculated current vector.

13. The control device for an elevator according to claim 11, wherein the first control circuit is configured to control a d-axis current in the current flowing through the three-phase motor so as to be 0 when the first control circuit uses vector control to control the three-phase motor, and wherein the second control circuit is configured to:

detect three-phase currents flowing through the three-phase motor from the obtained current information;

apply coordinate conversion to the three-phase currents, to thereby calculate a current vector on dq axes; and calculate the generation torque based on a magnitude of the calculated current vector.

14. A control device for an elevator, comprising:

a first control circuit configured to control a hoisting machine configured to raise and lower a car and a counterweight in a hoistway; and a second control circuit configured to obtain a generation torque which is a torque to be generated by the hoisting machine, and to limit the obtained generation torque to be generated by the hoisting machine so that the obtained generation torque is lower than an abnormal torque which is the generation torque generated when, under a state in which a movement of one of elevating bodies which are the car and the counterweight is limited, the other elevating body is wound by the hoisting machine, wherein the abnormal torque is the generation torque generated when the car being the other elevating body is wound by the hoisting machine under a state in which the counterweight being the one elevating body is in contact with a buffer provided in the hoistway so that a downward movement of the counterweight is limited.

15. A control device for an elevator, comprising:

a first control circuit configured to control a hoisting machine configured to raise and lower a car and a counterweight in a hoistway; and a second control circuit configured to obtain a generation torque which is a torque to be generated by the hoisting machine, and to limit the obtained generation torque to be generated by the hoisting machine so that the obtained generation torque is lower than an abnormal torque which is the generation torque generated when, under a state in which a movement of one of elevating bodies which are the car and the counterweight is limited, the other elevating body is wound by the hoisting machine, wherein the abnormal torque is a first abnormal torque which is the generation torque generated when the counterweight being the other elevating body is wound by the hoisting machine under a state in which the movement of the car being the one elevating body is limited by an emergency stop device provided for the car.

* * * * *